(12) United States Patent
Wang et al.

(10) Patent No.: US 9,788,076 B2
(45) Date of Patent: Oct. 10, 2017

(54) INTERNET PROTOCOL TELEVISION VIA PUBLIC WI-FI NETWORK

(71) Applicant: Alcatel-Lucent USA Inc., Murray Hill, NJ (US)

(72) Inventors: Shengqiang Wang, Cary, NC (US); Ranjan Sharma, New Albany, OH (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/229,098

(22) Filed: Mar. 28, 2014

(65) Prior Publication Data

US 2015/0249867 A1 Sep. 3, 2015

Related U.S. Application Data

(60) Provisional application No. 61/946,221, filed on Feb. 28, 2014.

(51) Int. Cl.
| | |
|---|---|
| *H04N 21/643* | (2011.01) |
| *H04N 21/6405* | (2011.01) |
| *H04N 21/438* | (2011.01) |
| *H04L 29/08* | (2006.01) |
| *H04N 21/2383* | (2011.01) |
| *H04W 8/08* | (2009.01) |

(Continued)

(52) U.S. Cl.
CPC ..... *H04N 21/64322* (2013.01); *H04L 12/185* (2013.01); *H04L 63/065* (2013.01); *H04L 63/104* (2013.01); *H04L 67/10* (2013.01); *H04N 21/2347* (2013.01); *H04N 21/2383* (2013.01); *H04N 21/26613* (2013.01); *H04N 21/4382* (2013.01); *H04N 21/6125* (2013.01); *H04N 21/6405* (2013.01); *H04W 8/08* (2013.01)

(58) Field of Classification Search
CPC ......... H04N 21/64322; H04N 21/6405; H04N 21/4382; H04N 21/2383
See application file for complete search history.

(56) References Cited

U.S. PATENT DOCUMENTS

| | | | |
|---|---|---|---|
| 5,748,736 A | 5/1998 | Mittra | |
| 7,865,193 B2 * | 1/2011 | Lin | H04W 88/02 370/235 |

(Continued)

FOREIGN PATENT DOCUMENTS

| | | |
|---|---|---|
| TW | I271976 | 1/2007 |
| WO | 2011082529 A1 | 7/2011 |
| WO | PCT/US2015/016006 | 7/2015 |

OTHER PUBLICATIONS

Wikipedia, IEEE 802.11i-2004, Jan. 22, 2014, Wikipedia, pp. 1-4, https://web.archive.org/web/20140122113102/http://en.wikipedia.org/wiki/IEEE_802.11i-2004.*

(Continued)

*Primary Examiner* — Pinkal R Chokshi
(74) *Attorney, Agent, or Firm* — Andrew R. Ralston

(57) ABSTRACT

An apparatus, e.g. a wireless media access point, includes a transceiver, a non-transitory storage medium, and a processor operably coupled to the transceiver and the storage medium. The processor is configured by instructions stored on the storage medium to transmit a first multicast channel associated with a first group temporal key (GTK), and to simultaneously transmit a second multicast channel associated with a second GTK.

5 Claims, 6 Drawing Sheets

(51) Int. Cl.
*H04L 12/18* (2006.01)
*H04L 29/06* (2006.01)
*H04N 21/2347* (2011.01)
*H04N 21/266* (2011.01)
*H04N 21/61* (2011.01)

(56) References Cited

U.S. PATENT DOCUMENTS

| | | |
|---|---|---|
| 8,611,270 B1 | 12/2013 | Sapkota et al. |
| 2003/0218980 A1 | 11/2003 | Fukushima et al. |
| 2004/0196812 A1 | 10/2004 | Barber |
| 2005/0086481 A1 | 4/2005 | Winget |
| 2005/0107081 A1* | 5/2005 | Kang et al. ............... 455/426.2 |
| 2007/0223701 A1 | 9/2007 | Emeott et al. |
| 2008/0031448 A1* | 2/2008 | Dang .................. H04N 7/1675 380/200 |
| 2008/0065884 A1* | 3/2008 | Emeott ................ H04L 9/0836 713/168 |
| 2008/0112324 A1 | 5/2008 | Li et al. |
| 2009/0055540 A1 | 2/2009 | Foti et al. |
| 2009/0147779 A1 | 6/2009 | Foti |
| 2009/0147958 A1* | 6/2009 | Calcaterra ............ H04L 9/0822 380/260 |
| 2009/0293082 A1* | 11/2009 | Chen ..................... H04N 7/162 725/25 |
| 2010/0023752 A1 | 1/2010 | Barker et al. |
| 2010/0239086 A1 | 9/2010 | Johnston et al. |
| 2010/0316050 A1 | 12/2010 | Baykal et al. |
| 2011/0149961 A1* | 6/2011 | Jarredal ............. H04L 12/1877 370/390 |
| 2011/0211693 A1 | 9/2011 | Carvalho et al. |
| 2012/0087315 A1 | 4/2012 | Sivaprakasam |
| 2013/0283360 A1* | 10/2013 | Hui ...................... H04L 9/0866 726/6 |
| 2014/0020039 A1 | 1/2014 | Wang et al. |
| 2014/0157298 A1* | 6/2014 | Murphy ........................ 725/14 |
| 2014/0181904 A1* | 6/2014 | Craig et al. ...................... 726/3 |
| 2014/0233734 A1 | 8/2014 | Ram et al. |
| 2015/0040195 A1* | 2/2015 | Park et al. ........................ 726/4 |
| 2015/0135209 A1* | 5/2015 | LaBosco et al. ............... 725/31 |
| 2015/0249867 A1 | 9/2015 | Wang et al. |

OTHER PUBLICATIONS

The I EEE Computer Society, IEEE Std 802.11 i -2004, Jul. 23, 2004.

* cited by examiner

INTERNET PROTOCOL TELEVISION VIA PUBLIC WI-FI NETWORK

CROSS-REFERENCE TO RELATED APPLICATIONS

This application claims the benefit of U.S. Provisional Application No. 61/946,221 filed on Feb. 28, 2014. The subject matter of this application is related to that of U.S. patent application Ser. No. 14/193,215 (the '215 application), filed on Feb. 28, 2014 and incorporated herein by reference in its entirety.

TECHNICAL FIELD

The disclosure relates generally to the field of wireless delivery of television.

BACKGROUND

This section introduces aspects that may be helpful to facilitating a better understanding of the inventions. Accordingly, the statements of this section are to be read in this light and are not to be understood as admissions about what is in the prior art or what is not in the prior art.

The number of WiFi access points is increasing rapidly. Some mobile network operators are also setting up WiFi access points to offload data traffic from mobile networks, e.g. of smart phones, tablet computer and laptops. The WiFi access points communicate with such end user devices using wireless channels as defined in IEEE 802.11 standards.

SUMMARY

One embodiment provides an apparatus, e.g. a wireless media access point, that includes a transceiver, a non-transitory storage medium, and a processor operably coupled to the transceiver and the storage medium. The processor is configured by instructions stored on the storage medium to transmit a first multicast channel associated with a first group temporal key (GTK), and to simultaneously transmit a second multicast channel associated with a second GTK.

In any embodiment of the apparatus the processor may be further configured to simultaneously transmit the first multicast channel to a first client device and the second multicast channel to a second client device. In any embodiment of the apparatus the processor may be further configured to implement an IEEE 802.11 communication standard. In any embodiment of the apparatus the processor may be further configured to associate the first GTK with the first multicast channel in a first GTK exchange message, and to associate the second GTK with the second multicast channel in a second GTK exchange message.

In any embodiment of the processor the processor may be further configured to provide the first GTK to a first client device in response to receiving a first request from the first client device to join the first multicast channel, and to provide the second GTK to a second client device in response to receiving a second request from the second client device to join the second multicast channel. In such embodiments the processor may also be further configured to provide a third GTK to the first client device and a fourth GTK to the second client device in response to receiving a request from the first client device to join a third multicast channel.

Another embodiment provides an apparatus, e.g. a client device, including a transceiver, a non-transitory storage medium, and a processor operably coupled to the transceiver and the storage medium. The processor is configured by instructions stored on the storage medium to decode a first multicast channel using a first GTK, and to decode the first multicast channel using a second different GTK without terminating receipt of the first multicast channel.

In any embodiment of the immediately preceding apparatus, the processor may be configured to decode the first multicast channel without interruption of output to a user. In any embodiment of the apparatus the processor may be further configured to implement an 802.11 communication standard.

Another embodiment provides a method, e.g. of manufacturing a media access point. The method includes configuring a processor to transmit a first multicast channel associated with a first group temporal key (GTK). The method further includes configuring the processor to simultaneously transmit a second multicast channel associated with a second GTK.

Any embodiment of the method may further include configuring the processor to simultaneously transmit the first multicast channel to a first client device and the second multicast channel to a second client device. Any embodiment of the method may further include configuring the processor to transmit a first GTK exchange message that associates the first GTK with the first multicast channel, and to transmit a second GTK exchange message that associates the second GTK with the second multicast channel.

Any embodiment of the method may further include configuring the processor to provide the first GTK to a first client device in response to receiving a first request from the first client device to join the first multicast channel, and to provide the second GTK to a second client device in response to receiving a second request from the second client device to join the second multicast channel. Any such embodiment may further include configuring the processor to provide a third GTK to the first client device and a fourth GTK to the second client device in response to receiving a request from the first client device to join a third multicast channel.

Another embodiment provides a method, e.g. of manufacturing a client device such as a laptop computer, a pad computer or a smart phone. The method includes configuring a processor to decode a first multicast channel using a first group temporal key (GTK). The method further includes configuring the processor to decode the first multicast channel using a second different GTK without terminating receipt of the first multicast channel. Any embodiment of the method may further include configuring the processor to decode the first multicast channel without interruption of output to a user.

Another embodiment provides a method, e.g. performed at a media access point. The method includes transmitting a first multicast channel associated with a first group temporal key (GTK). The method further includes simultaneously transmitting a second multicast channel associated with a second GTK.

Any embodiment of the method may further include simultaneously transmitting the first multicast channel to a first client device and the second multicast channel to a second client device.

Any embodiment of the method may further include providing the first GTK to a first client device in response to receiving a first request from the first client device to join the first multicast channel, and providing the second GTK to a second client device in response to receiving a second request from the second client device to join the second multicast channel. Any such embodiment may further include providing a third GTK to the first client device and a fourth GTK to the second client device in response to receiving a request from the first client device to join a third multicast channel.

Another embodiment provides a method, e.g. performed at a client device. The method includes decoding a first multicast channel using a first group temporal key (GTK). The method further includes decoding the first multicast channel using a second different GTK without terminating receipt of the first multicast channel. Any embodiment of the method may further include decoding the first multicast channel without interruption of output to a user.

BRIEF DESCRIPTION OF THE DRAWINGS

A more complete understanding of the present invention may be obtained by reference to the following detailed description when taken in conjunction with the accompanying drawings, wherein.

DETAILED DESCRIPTION

The disclosure is directed to, e.g. improved methods and systems for using the wireless infrastructure provided in part by 802.11 (WiFi) standards to deliver television (TV) content via internet protocol (IP) messaging.

Figure 1:
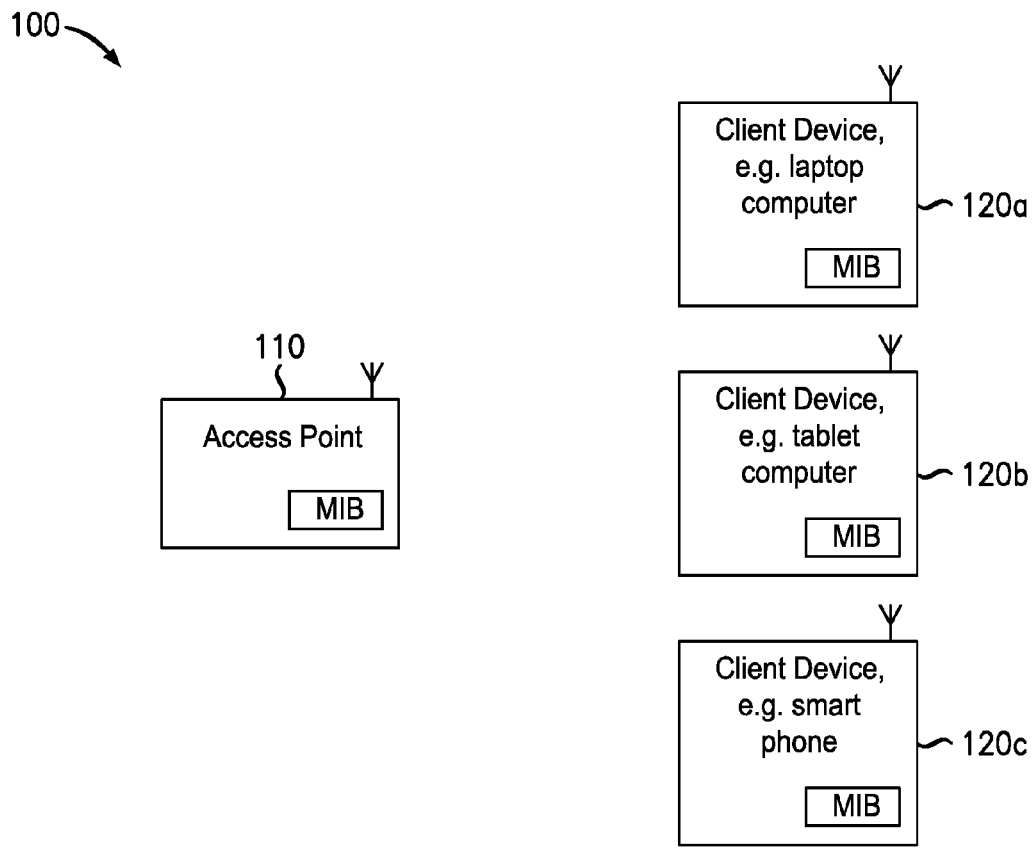
FIG. 1 illustrates a conventional system in which a media access point is in wireless communication with a plurality of mobile client devices, e.g. computers, smart phones and tablets.

FIG. 1 illustrates at a high level an illustrative embodiment of a system 100, e.g. a group of devices wirelessly associated with each other. The system 100 includes an access point 110, and three client devices, e.g. computer 120a, a tablet 120b and a smart phone 120c. Each of the access point 110 and the clients 120a, 120b and 120c includes an MIB for storage of parameters related to multicasting operations. The MIB on the access point 110 and all clients contains pertinent information. For example, the MIB relevant of the access point 110 may store up to four GTK keys with Key IDs, and identities of clients, e.g. the clients 120a and 120b, that have joined the multicast stream.

Embodiments within the scope of the disclosure are not limited to any particular number or type of client devices. Any number of client devices may be referred to as (a) client device(s) 120 when a distinction between client devices is unneeded. Operation of various embodiments may be described with reference to the access point 110 and the client devices 120 without limitation to any specific configuration of access points and/or client devices. The client devices 120 may be referred to for brevity as clients 120 without loss of generality.

Those skilled in the art will appreciate that the access point 110 and the clients 120 may be viewed as members of a media access control (MAC) layer. Accordingly, the system 100 may also be referred to as a MAC layer 100, and access point 100 and the clients 120 may be referred to as members of the MAC layer 100.

The access point 110 and the clients 120 are configured to operate under the 802.11 standard, augmented according to one or more embodiments described herein. The 802.11 standards, sometimes referred to herein as "Wi-Fi", provide operating standards for the access point 110 and the clients 120. The 802.11 standards include provisions for multicasting as part of asynchronous services.

Figure 2:
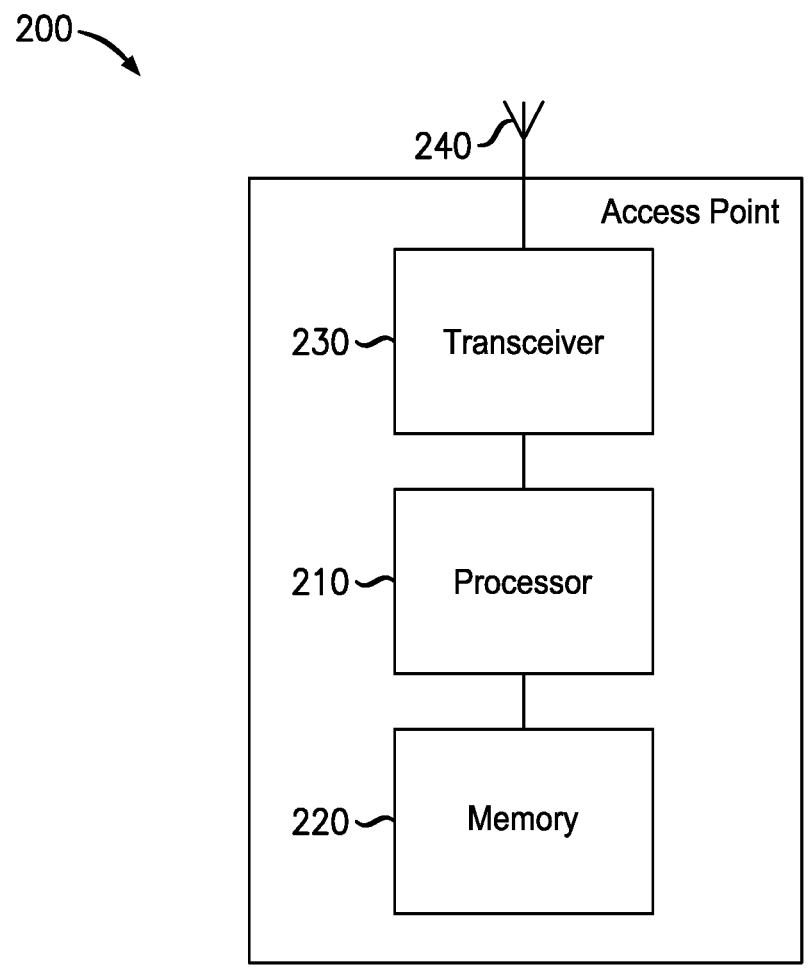
FIG. 2 illustrates an example high-level schematic of a media access point configured to operate according to various embodiments.

FIG. 2 illustrates schematically an apparatus 200 that may operate as an access point, e.g. the access point 110 of FIG. 1. The apparatus 200 includes a processor 210 operably coupled to a memory 220 and a transceiver 230. Each of the processor 210, memory 220 and transceiver 230 may be of any conventional or future-developed type, with the exception of embodiments described herein. The memory 220 includes non-transitory physical instruction space that holds operating instructions executed by the processor 230 according to such embodiments. These instructions include such instructions to implement, e.g. operation that conforms to the 802.11 standard, and various steps of embodiments herein described. The processor 210 is configured to control the transceiver 230 to communicate, via an antenna 240, with one or more client devices, e.g. the client devices 120 of FIG. 1. The antenna 240 is not limited to any particular type, and may include multiple antenna elements to implement multiple-input multiple-output (MIMO) communication.

Figure 3:
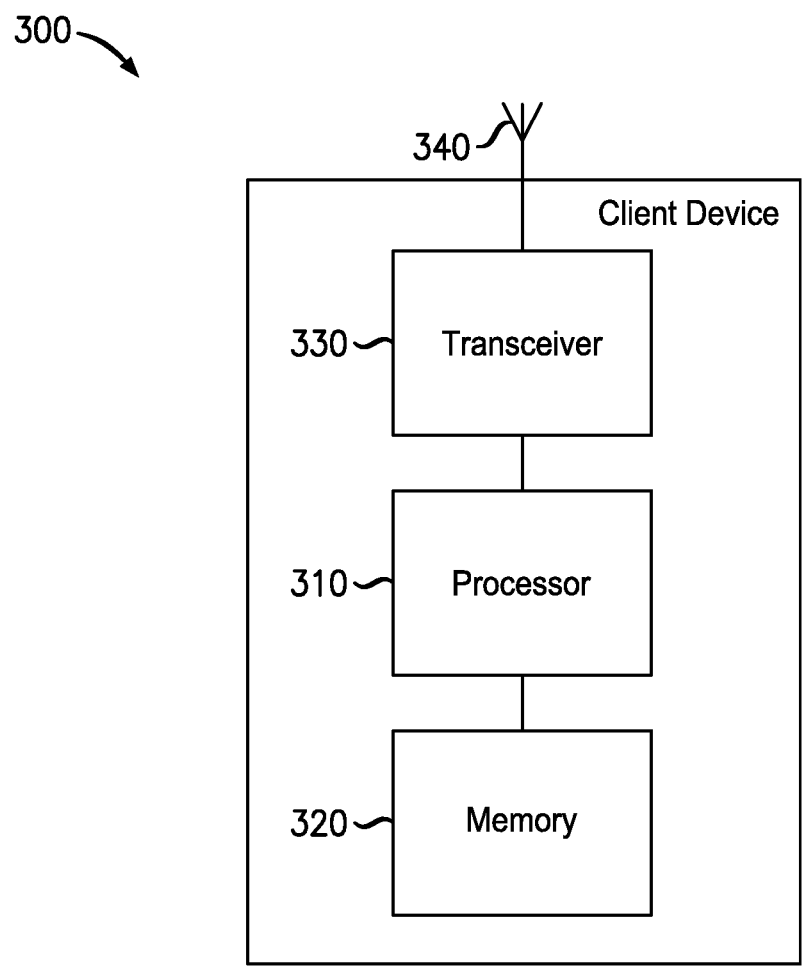
FIG. 3 illustrates an example high-level schematic of a mobile client device configured to operate according to various embodiments.

FIG. 3 illustrates schematically an apparatus 300 that may operate as a client device, e.g. any of the client devices 120 of FIG. 1. The apparatus 300 includes a processor 310 operably coupled to a memory 320 and a transceiver 330. Each of the processor 310, memory 320 and transceiver 330 may be configured to provide functionality consistent with embodiments within the scope of the disclosure, and may otherwise be any conventional or future-developed type. The memory 320 includes non-transitory physical instruction space that holds operating instructions executed by the processor 330 according to such embodiments. These instructions include such instructions to implement, e.g. operation that conforms to the 802.11 standard, and various steps of embodiments herein described. The processor 310 is configured to control the transceiver 330 to communicate, via an antenna 340, with an access point, e.g. the access point 110 of FIG. 1. The antenna 340 is not limited to any particular type, and may include multiple antenna elements to implement MIMO communication.

Group Temporal Keys (GTK) may be updated from time to time in various situations, such as when a GTK update timer expires or when a client leaves the WiFi access point communication umbrella. When the GTK is updated the access point 110 may send an updated GTK to the clients 120a and 120b. In this circumstance, the access point 110 makes available to the clients 120a, 120b a starting multicast packet sequence number from which the new GTK will be used. Clients, of which the clients 120a and 120b are two examples, collectively form a media access control (MAC) layer of clients that may start to use the new GTK to decrypt the multicast packets when the clients see the packet sequence number.

The Managed Information Base (MIB) of the MAC layer stores four Key IDs with Keys. Key ID 0 is for unicast pair-wise keys. Key IDs 1, 2 and 3 are for GTK updates, as during a GTK update transaction. Various embodiments may require that at least two GTK keys be available at the same time.

In prior art multicast implementations all multicast streams are encrypted with the same single GTK key. This may be inadequate for IP multicast internet protocol television (IPTV) deployment. For IP multicast IPTV, normally clients have different channel subscription packages. Under the current 802.11 standards, all clients can view all the channels being sent from the access point in multicast manner.

The inventors have recognized that current multicast standards, e.g. the Institute of Electrical and Electronics Engineers (IEEE) 802.11 standard, may be advantageously extended to implement various embodiments described below to provide improved multicasting capability. More specifically, each IPTV channel may be viewed as a multicast stream. Each channel may be encrypted with a GTK unique to that channel. Only clients that are authenticated to a particular channel are allowed to join that channel and receive the unique GTK corresponding to that channel. When the update timer expires, or a client leaves the channel, the GTK will be updated with all clients that remain authenticated to receive the channel. In this manner, as different channels are encrypted with different GTK keys, clients are restricted to viewing only the channels they are subscribed to and allowed to join. Such embodiments provide for differential subscription packages to be deployed and accessed via public WiFi.

Figure 4:
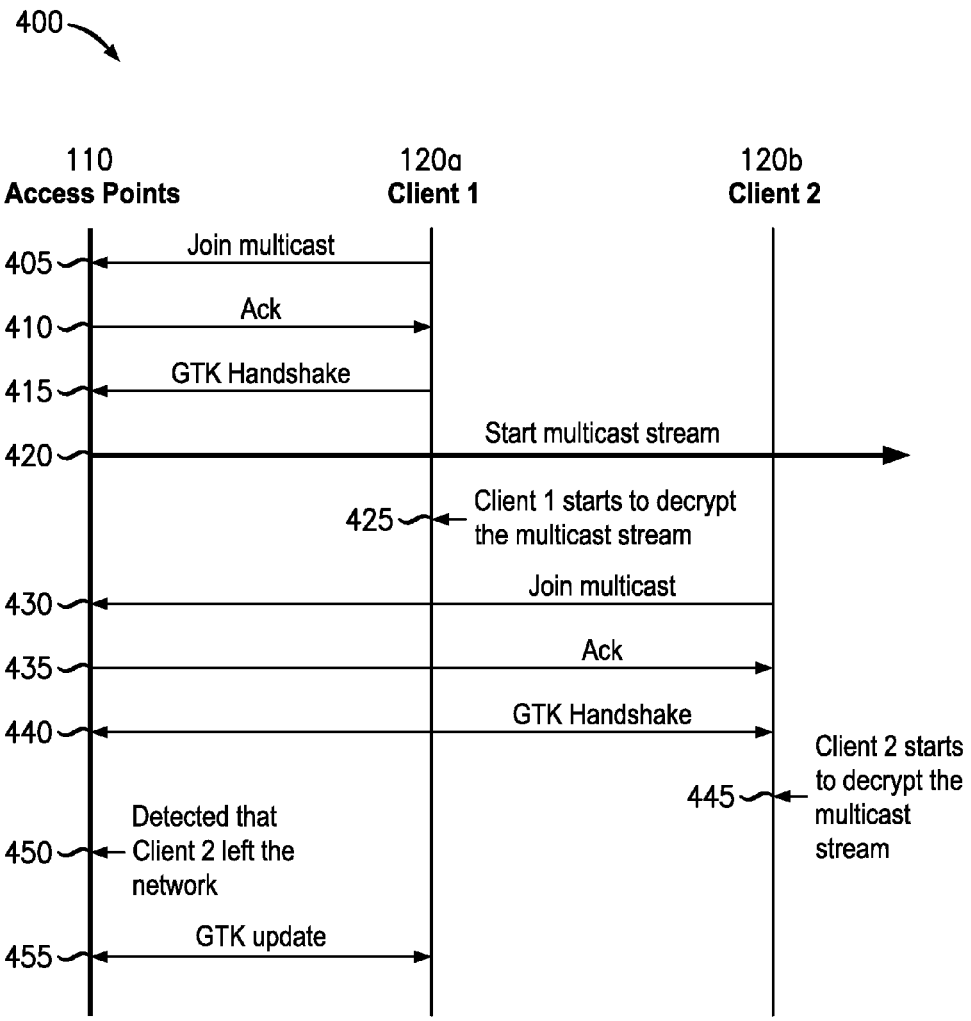
FIG. 4 illustrates steps implemented in a conventional system in which a media access point is in wireless communication with a plurality of client devices.

FIG. 4 illustrates a method 400 including transactions between the access point 110 and two client devices 120a and 120b in conventional multicasting. Those skilled in the art will appreciate that the illustrated transactions are encompassed by the existing 802.11 standard.

In a step 405 the client 120a initiates a multicast delivery session by transmitting in the direction of the access point 110 a multicast join request, e.g. packets in 802.11 unicast data frames. The access point 110 responds in a step 410 with an acknowledgement, e.g. an 802.11 acknowledgement frame, directed to the client 120a.

In a step 415 the access point 110 and the client 120a conduct a key handshake in which the access point 110 transmits a Group Temporal Key (GTK) toward the client 120a. After sending the GTK, in a step 420 the access point 110 transmits the data requested by the client 120a, e.g. the data the client 120a wants to multicast, as a multicast frame encrypted with GTK. In a step 425 the client 120a begins to decrypt the multicast stream using the GTK acquired in the step 415.

The multicast frame includes a group address as the destination for the intended recipients, e.g. the client 120a and any other clients that may be configured to receive the transmission. Each of the destination stations, e.g. the clients 120a and 120b, can receive the frame. However, only clients with a valid GTK can decrypt the multicast frames.

In a step 430 the client 120b directs a request to the access point 110 to join the multicast transmission. As described for the client 120a, the access point sends an acknowledgement in a step 435 and conducts a key handshake in a step 440. The client 120b begins to decode the multicast stream in a step 445.

In due course the client 120b leaves the network. The access point 110 detects this event in a step 450. In a step 455 the access point 110 and the client 120a engage in a GTK update. The client 120a may then continue decoding the multicast stream. If the client 120b were to return to the network, the client 120b would not be able to decode the multicast stream without again requesting to join the multicast stream.

This disclosure recognizes that as commercial distribution of media evolves, different clients connected to a same access point may have media access subscriptions that permit different levels of access. Continuing the example of FIG. 4, the clients 120a and 120b may subscribe to a media distribution entity that provides multiple multicast channels, e.g. including a sports channel and a drama channel. The client 120a may subscribe to the sports channel but not the drama channel, while the client 120b may subscribe to the drama channel but not the sports channel.

In the conventional method 400 all multicast streams are encrypted with the same single GTK key. Thus conventional operation under the existing 802.11 standard allows all clients to view all the channels being multicast from the access point 110. Accordingly this aspect of conventional operation is not suited to the described scenario in which different clients do not have privileges to all the multicast channels accessible via the access point 110.

Embodiments of this disclosure address this inadequacy by providing enhancements to relevant standards, e.g. the 802.11 standard, to provide access control of multicast streams in a network including subscribes with unique access privileges. In various embodiments the MIB may be extended as follows:

1. The MIB size at the access point 110 may be increased to accommodate a larger number of GTK keys and Key IDs. For example a typical IPTV deployment may need to support up to 2048 channels. In this example, 4096 GTK Keys and Key IDs need to be supported, as two GTK keys need to be available at the same time for each supported channel during a GTK update, such as in the step 455. However, in practical operation the clients 120 may only join up to several channels simultaneously. Therefore, the size of the MIB at the clients 120 may not need modification.

2. The multicast channels/streams being multicast may be recorded.

3. For each multicast channel/stream, the set of clients currently watching the channel may be recorded.

4. The GTK exchange message (GTK KDE) format may be modified to communicate a larger number of GTK Key IDs, e.g. 4096, and to communicate which IPTV channel the each GTK key is associated with. In the absence of some accommodation clients operating under conventional standards may be unable to understand the GTK KDE format modified according to some embodiments. In various embodiments the components of the system, e.g. the access points, are configured to be backward-compatible with such clients.

In the preceding list, data referred to in items 1 and 2 may be created and updated by the MAC layer of access points 110 and clients 120.

In the preceding list the data referred to in item 3 may be programmed by an IPTV application running on the access point 110. See, e.g. the '215 application. The MAC layer on the access point 120 may be enhanced to interface to the IPTV application to notify the application when a client 120 requests to join or leave any IPTV channel. The IPTV application in turn may provide a list of clients 120 watching a given channel to the MAC layer MIB table.

Figure 5:
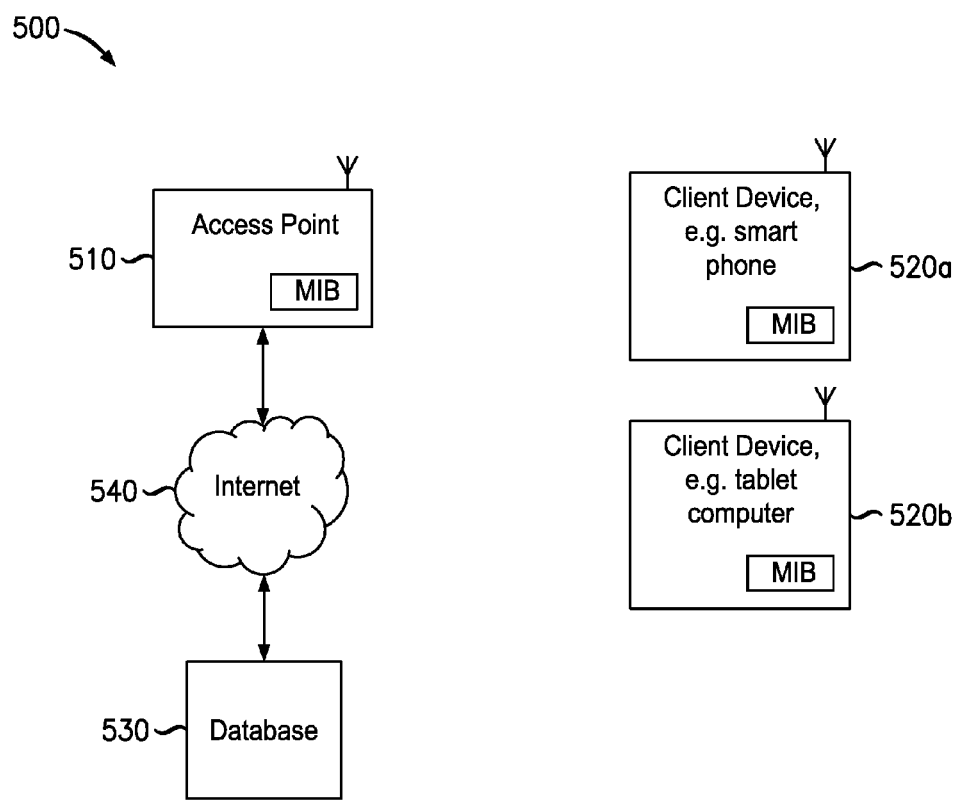
FIG. 5 illustrates a system in accordance with embodiments of the disclosure, in which a media access point is in wireless communication with a plurality of mobile client devices, e.g. computers, smart phones and tablets, at least some of which are configured to accommodate simultaneously transmission of multiple multicast channels by the access point.

FIG. 5 illustrates a system 500 configured to operate consistent with described embodiments of the disclosure. The system 500 includes an access point 510 and clients 520a and 520b. The access point 510 and clients 520a/b each include an MIB for storage of parameters related to multicasting operations. The access point 510 and the clients 520a/b may communicate wirelessly via unreferenced antennae. The access point 510 may communicate with a central database 530 via the internet 540. While only two clients 520a/b are shown in the system 500, it will be immediately apparent to those skilled in the art that the described embodiment may be expanded to include any number of clients subject to, e.g. storage limitations within the access point 510.

Figure 6:
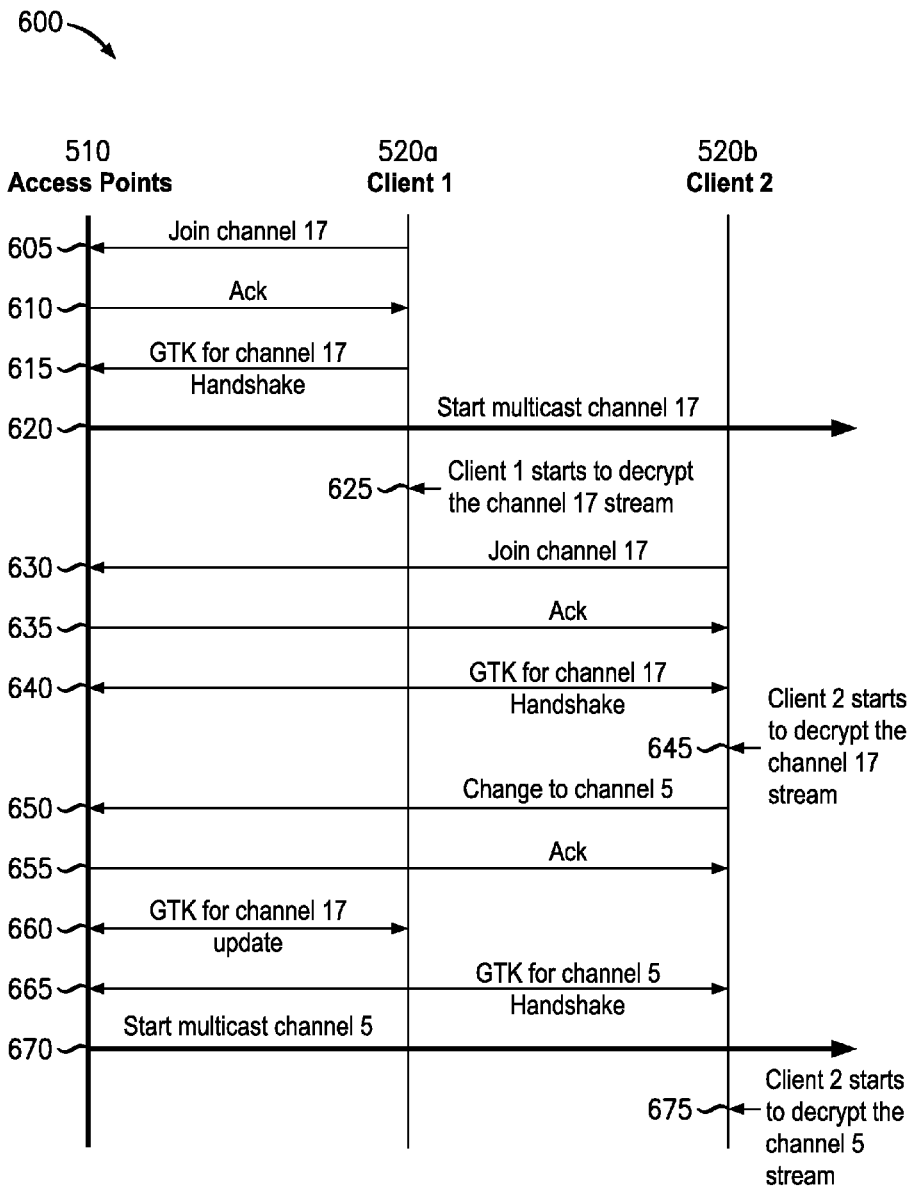
FIG. 6 illustrates steps of a method of operating the media access point and client devices of FIG. 5 according to embodiments of the disclosure.

FIG. 6 illustrates in a method 600 transactions between the access point 510, and the clients 520a and a second client 520b, consistent with the enhanced multicasting operation described above. Embodiments may include more than two clients 520, with two shown for simplicity. In some embodiments some of the illustrated steps may be omitted, illustrated steps may be performed in an order different than the illustrated order, and/or steps other than the illustrated steps may be performed in combination with some or all of the illustrated steps. More specifically, details regarding GTK update when the GTK update timer expires and when a client leaves the network are similarly omitted for simplicity. Those skilled in the art will immediately recognize how these situations may be implemented in view of the description below.

In a step 605 the client 520a sends toward the access point 510 a request to join an IPTV channel, shown in a nonlimiting example as channel 17. In a step 610 the access point 510 sends toward the client 520a an acknowledgement (Ack). In various embodiments if the client 520a fails to detect the Ack signal, then the client 520a retransmits (not shown) the join request 605. In various embodiments the leg of the data path from the client 520a to the access point 510 includes transmission error recovery, consistent with multicast signaling standards. For example, the 802.11 protocols ensure reliability between stations in both infrastructure and ad hoc configurations when using unicast data frame transmissions.

In a step 615 a group temporal key (GTK) handshake is performed between the access point 510 and the client 520a. In the handshake, the access point 510 sends the GTK to the client 520a for channel 17 specifically.

In some embodiments the access point 510, before sending the acknowledgement in the step 610, checks permissions for the client 520a and ascertains that the client 520a has permission to view the requested channel, e.g. channel 17. This check may include the access point 510 querying the central database 530. In some embodiments the acknowledgement may be sent after the access point 510 inspects a cookie or cookie-like element provided by the client 520a during the GTK handshake in the step 615. In such embodiments, the handshake occurs before the acknowledgement. In the GTK handshake, the access point 510 provides the client 520 with a GTK, referred to for later reference as a first GTK.

In a step 620 the access point initiates transmission of the requested channel 17 multicast stream if the channel was not previously streaming. Of course this transmission is contingent on success of the transactions of steps 605, 610 and 615. The extended arrow of the step 620 reflects that any number of clients previously authenticated may receive the channel 17 stream. In a step 625 the client 520a begins to receive and decrypt the channel 17 multicast stream.

In a step 630 the client 520b sends toward the access point 510 a request to join to the channel 17 multicast stream. The access point 510 authenticates the client 520b as described for the client 510a, including an acknowledgment 635 and GTK handshake 640 for channel 17 specifically. As described with respect to the client 520a, the access point may query the central database 530, or may inspect a cookie provided by the client 520b in the GTK handshake at step 640 before sending the acknowledgement. In a step 645 the client 520b begins decrypting the ongoing channel 17 stream.

In the example of FIG. 5, a viewer of the client 520b may wish to change from the ongoing channel 17 stream to another stream, e.g. channel 5. This change is reflected in a step 650 in which the client 520b sends a request to the access point 510 to view streaming IPTV channel 5. In a step 655 the access point 510 directs to the client 520b an acknowledgement. In a step 660 the access point 510 and the client 520a conduct a GTK handshake that updates the access credentials for channel 17 with a new, second, GTK. Thus the client 520a may decode subsequent channel content without terminating the connection to channel 17. Client 520a may thus continue to view the channel 17 stream, while the client 520b is now denied access to channel 17. Preferably the processor 310 of the client 520b is configured to decode the channel 17 stream without interruption to a user of the client 520a, such that the user is unaware of the GTK update. In a step 665 the access point 510 and the client 520b conduct a GTK handshake to grant access by the client 520b to the channel 5 IPTV stream. In this step the access point 510 issues a new, third, GTK to the client 520b. In a step 670 the access point 510 begins streaming channel 5 (if not already streaming this channel), and in step 675 the client 520 begins decoding the channel 5 stream. Thus the access point 510 simultaneously transmits the multicast channel 5 and the multicast channel 17. Herein, "simultaneously" in the context of multiple multicast transmissions means that at least a portion of a first transmission to a first client device temporally overlaps a second transmission to a second client device.

In a similar manner as already described, if the client 520a were to request to change to a third multicast channel, e.g. channel 10, the access point would issue a new, fourth, GTK to client 520b to continue streaming channel 5, and would issue a new, fifth, GTK to client 520a to stream channel 10.

Although multiple embodiments of the present invention have been illustrated in the accompanying drawings and described in the foregoing detailed description, it should be understood that the present invention is not limited to the disclosed embodiments, but is capable of numerous rearrangements, modifications and substitutions without departing from the invention as set forth and defined by the following claims.

The invention claimed is:

1. An apparatus, comprising:
   a transceiver;
   a non-transitory storage medium; and
   a processor operably coupled to the transceiver and the storage medium, the processor being configured by instructions stored on the storage medium to:
   decode a first multicast channel received from an access point (AP) using a first group temporal key (GTK);

direct to the AP a request to receive a second multicast channel;
receive a second different GTK from the AP in response to the request;
decode the second multicast channel using the second different GTK; and
decode the second multicast channel while continuing to receive the first multicast channel.

2. The apparatus of claim 1, wherein the processor is further configured to implement an 802.11 communication standard.

3. A method performed at a client device, comprising:
decoding a first multicast channel received from an access point (AP) using a first group temporal key (GTK);
directing to the AP a request to receive a second multicast channel;
receiving a second different GTK from the AP in response to the request;
decoding the second multicast channel using the second different GTK; and
decoding the second multicast channel while continuing to receive the first multicast channel.

4. A method, comprising:
configuring a processor to decode a first multicast channel received from an access point (AP) using a first group temporal key (GTK);
configuring the processor to direct to the AP a request to receive a second multicast channel;
configuring the processor to receive a second different GTK from the AP in response to the request;
configuring the processor to decode the second multicast channel using the second different GTK; and
configuring the processor to decode the first second multicast channel while continuing to receive the first multicast channel.

5. The method of claim 4, further comprising configuring the processor to implement an 802.11 communication standard.

* * * * *